US008275572B2

(12) United States Patent
Burns et al.

(10) Patent No.: US 8,275,572 B2
(45) Date of Patent: *Sep. 25, 2012

(54) DIFFERENCE FREQUENCY DETECTION WITH RANGE MEASUREMENT

(75) Inventors: Richard H. Burns, North Hollywood, CA (US); Donald Elliot Harrington, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/481,941

(22) Filed: Jun. 10, 2009

(65) Prior Publication Data
US 2011/0231150 A1    Sep. 22, 2011

(51) Int. Cl.
*G06F 15/00* (2006.01)
(52) U.S. Cl. ............ 702/158; 702/75; 702/150; 342/13; 342/59; 342/22
(58) Field of Classification Search .............. 702/75–76, 702/150–181; 342/13–14, 59, 22
See application file for complete search history.

(56) References Cited

U.S. PATENT DOCUMENTS

| | | | |
|---|---|---|---|
| 3,745,575 A | 7/1973 | Kikuchi | |
| 3,775,765 A | 11/1973 | Di Piazza et al. | |
| 3,831,173 A | 8/1974 | Lerner | |
| 5,327,139 A | 7/1994 | Johnson | |
| 5,457,394 A | 10/1995 | McEwan | |
| 5,506,590 A | 4/1996 | Minter | |
| 5,512,834 A | 4/1996 | McEwan | |
| 5,668,342 A | 9/1997 | Discher | |
| 5,819,859 A | 10/1998 | Stump et al. | |
| 5,900,833 A | 5/1999 | Sunlin et al. | |
| 6,057,765 A | 5/2000 | Jones et al. | |
| 6,060,815 A | 5/2000 | Nysen | |
| 6,094,157 A | 7/2000 | Cowdrick | |
| 6,163,259 A | 12/2000 | Barsumian et al. | |
| 6,438,468 B1 | 8/2002 | Muxlow et al. | |
| 6,501,414 B2 | 12/2002 | Arndt et al. | |
| 6,522,285 B2 | 2/2003 | Stolarczyk et al. | |

(Continued)

FOREIGN PATENT DOCUMENTS

WO    WO 00/77614 A2    12/2000

(Continued)

OTHER PUBLICATIONS

USPTO Office Action dated Aug. 26, 2011 for U.S. Appl. No. 11/758,785.

(Continued)

*Primary Examiner* — Jonathan C Teixeira Moffat
*Assistant Examiner* — Hien Vo
(74) *Attorney, Agent, or Firm* — Yee & Associates, P.C.

(57) ABSTRACT

A method and apparatus for detecting objects. A first plurality of electromagnetic signals having a first frequency and a second plurality of electromagnetic signals having a second frequency are transmitted. At least one of the first frequency and the second frequency is changed through a range of frequencies. A delayed difference frequency signal substantially equal to a difference between the first frequency and the second frequency is monitored for. The delayed difference frequency signal is generated by an object having non-linear electrical characteristics in response to the object receiving the first plurality of electromagnetic signals and the second plurality of electromagnetic signals. A range measurement is generated for the object by comparing the delayed difference frequency signal and an undelayed difference frequency signal. The undelayed difference frequency signal is substantially equal to the difference between the first frequency and the second frequency.

20 Claims, 6 Drawing Sheets

U.S. PATENT DOCUMENTS

| | | |
|---|---|---|
| 6,545,945 B2 | 4/2003 | Caulfield |
| 6,671,589 B2 | 12/2003 | Holst et al. |
| 6,765,527 B2 | 7/2004 | Jablonski et al. |
| 6,795,754 B2 | 9/2004 | Sunami et al. |
| 6,864,825 B2 | 3/2005 | Holly |
| 6,894,624 B2 | 5/2005 | Kim et al. |
| 6,897,777 B2 | 5/2005 | Holmes et al. |
| 6,943,742 B2 | 9/2005 | Holly |
| 6,950,076 B2 | 9/2005 | Holly |
| 6,999,041 B2 | 2/2006 | Holly |
| 7,009,575 B2 | 3/2006 | Holly et al. |
| 7,130,624 B1 | 10/2006 | Jackson et al. |
| 7,142,147 B2 | 11/2006 | Holly |
| 7,162,285 B2 | 1/2007 | Owens et al. |
| 7,190,302 B2 | 3/2007 | Biggs |
| 7,366,589 B2 | 4/2008 | Habermas |
| 7,473,898 B2 | 1/2009 | Holly et al. |
| 7,486,250 B2 | 2/2009 | Vetrovec et al. |
| 7,500,238 B2 | 3/2009 | Nestoryak |
| 7,512,511 B1 | 3/2009 | Schultz et al. |
| 7,515,094 B2 | 4/2009 | Keller, III |
| 7,528,762 B2 | 5/2009 | Cerwin |
| 7,557,710 B2 | 7/2009 | Sanchez et al. |
| 7,636,568 B2 | 12/2009 | Gould et al. |
| 7,769,501 B2 | 8/2010 | Lusardi et al. |
| 7,777,671 B2 | 8/2010 | Schnitzer et al. |
| 7,778,213 B2 | 8/2010 | Alrabady et al. |
| 7,827,549 B2 | 11/2010 | Tarassov |
| 7,893,862 B2 | 2/2011 | Holly et al. |
| 8,015,794 B2 | 9/2011 | Winkler et al. |
| 8,035,550 B2 | 10/2011 | Holly et al. |
| 8,051,031 B2 | 11/2011 | Sims, III et al. |
| 8,054,212 B1 | 11/2011 | Holly et al. |
| 8,055,393 B2 | 11/2011 | Sims, III et al. |
| 2002/0011947 A1 | 1/2002 | Stolarczyk et al. |
| 2002/0111720 A1 | 8/2002 | Holst et al. |
| 2002/0175849 A1 | 11/2002 | Arndt et al. |
| 2003/0028899 A1 | 2/2003 | MacInnis |
| 2003/0041236 A1 | 2/2003 | Nestoryak |
| 2004/0106404 A1 | 6/2004 | Gould et al. |
| 2005/0026609 A1 | 2/2005 | Brinkley et al. |
| 2005/0062639 A1 | 3/2005 | Biggs |
| 2005/0064922 A1 | 3/2005 | Owens et al. |
| 2005/0200550 A1 | 9/2005 | Vetrovec et al. |
| 2005/0256614 A1 | 11/2005 | Habermas |
| 2005/0288831 A1 | 12/2005 | Lusardi et al. |
| 2006/0082488 A1 | 4/2006 | Keller |
| 2006/0206587 A1 | 9/2006 | Fabbrocino |
| 2007/0013577 A1 | 1/2007 | Schnitzer et al. |
| 2007/0024489 A1 | 2/2007 | Cerwin |
| 2007/0046791 A1 | 3/2007 | Wang et al. |
| 2008/0092518 A1 | 4/2008 | Winkler et al. |
| 2008/0127171 A1 | 5/2008 | Tarassov |
| 2008/0127175 A1 | 5/2008 | Naranjo et al. |
| 2008/0295090 A1 | 11/2008 | Bestle et al. |
| 2009/0040093 A1 | 2/2009 | Holly et al. |
| 2009/0198393 A1 | 8/2009 | Sims, III et al. |
| 2009/0198712 A1 | 8/2009 | Sims, III et al. |
| 2010/0001899 A1 | 1/2010 | Holly et al. |
| 2012/0146767 A1 | 6/2012 | Holly et al. |

FOREIGN PATENT DOCUMENTS

| | | |
|---|---|---|
| WO | WO 2006/110991 A1 | 10/2006 |
| WO | 2009099710 A1 | 8/2009 |

OTHER PUBLICATIONS

Thomas, "Common Airborne Instrumentation System: A Fresh Look", Accession No. ADA392006, Naval Air Warfare Center Aircraft Div Patuxent River MD, Jul. 2001.

Brada, "Metadata Support for Safe Component Upgrades", Proc. of Compsac '02, 26th Annual Intl Computer Software & Applications Conf., Oxford England, IEEE Aug. 2002.

USPTO office action for U.S. Appl. No. 12/026,918 dated Feb. 3, 2011.

USPTO office action for U.S. Appl. No. 12/026,926 dated Mar. 14, 2011.

U.S. Appl. No. 12/412,919, filed Mar. 27, 2009, Holly et al.

USPTO Notice of Allowance for U.S. Appl. No. 12/026,918 dated Jul. 22, 2011.

USPTO Notice of Allowance for U.S. Appl. No. 12/026,926 dated Jul. 13, 2011.

Wilson et al., "Improvised Explosive Devices (IEDs) in Iraq and Afghanistan: Effects and Countermeasures", CRS Report for Congress, updated Nov. 21 2007, pp. 1-6.

U.S. Appl. No. 12/504,293, filed Jul. 16, 2009, Holly et al.

U.S. Appl. No. 11/758,787, filed Jun. 6, 2007, Holly et al.

U.S. Appl. No. 11/758,785, filed Jun. 6, 2007, Holly et al.

USPTO Office Action dated Sep. 27, 2011 for U.S. Appl. No. 11/758,787, pp. 17.

USPTO Office Action dated Aug. 21, 2009 for U.S. Appl. No. 12/167,753, pp. 10.

USPTO Final Office Action dated Jan. 5, 2010 for U.S. Appl. No. 12/167,753, pp. 8.

USPTO Office Action dated Jul. 9, 2010 for U.S. Appl. No. 12/167,753, pp. 5.

USPTO Notice of Allowance dated Oct. 18, 2010 for U.S. Appl. No. 12/167,753, pp. 7.

USPTO Office Action dated Apr. 28, 2010 for U.S. Appl. No. 12/026,918, pp. 22.

USPTO Final Office Action dated Aug. 27, 2010 for U.S. Appl. No. 12/026,918, pp. 14.

USPTO Office Action dated Oct. 19, 2010 for U.S. Appl. No. 12/026,926, pp. 16.

USPTO Notice of Allowance dated Sep. 13, 2011 for U.S. Appl. No. 12/412,919, pp. 20.

USPTO Office Action dated Dec. 7, 2011 for U.S. Appl. No. 12/504,293, pp. 21.

USPTO Notice of Allowance dated Mar. 8, 2012 for U.S. Appl. No. 11/758,787, pp. 10.

International Search Report dated Mar. 6, 2009, regarding Application No. PCT/US2009/030652 (WO 2009099710), 3 pages.

PCT Application No. PCT/US2009/030852, filed Jan. 9, 2009, 32 pages.

USPTO Notice of Allowance, dated Jun. 19, 2012, regarding U.S. Appl. No. 11/758,785, 12 pages.

USPTO Notice of Allowance, dated Jun. 20, 2012, regarding U.S. Appl. No. 11/758,787, 12 pages.

DIFFERENCE FREQUENCY DETECTION WITH RANGE MEASUREMENT

GOVERNMENT LICENSE RIGHTS

This disclosure was made with Government support under contract number N00174-08-C-0031 awarded by the United States Navy. The Government has certain rights in this invention.

BACKGROUND INFORMATION

1. Field

The present disclosure relates generally to detecting objects and, in particular, to a method and apparatus for detecting a location of an object. Still more particularly, the present disclosure relates to a method and apparatus for identifying a distance to an object using electromagnetic radiation.

2. Background

Improvised explosive devices are bombs constructed and deployed in manners not normally used by conventional military organizations. Improvised explosive devices may be used by terrorists, guerillas, and other forces. Improvised explosive devices may be placed on a roadway. In some cases, an improvised explosive device may be carried in a car, a truck, or by a person.

An improvised explosive device may have a power supply, a trigger, a detonator, a main charge, and a container. The improvised explosive device also may include shrapnel-generating objects, such as nails or ball bearings.

The trigger is a mechanism to set off the device. The trigger may be, for example, a radio signal, a tripwire, a timer, or a firing button. Improvised explosive devices have employed cell phones, cordless phones, garage door openers, and/or some other type of electronic device.

To counter improvised explosive devices, jamming systems have been employed to prevent setting off improvised explosive devices. Although jamming systems may be used to prevent setting off improvised explosive devices, these types of jamming systems do not detect the presence of or disarm the device.

Additionally, various technologies have been used to identify improvised explosive devices. These technologies involve using radar, x-rays, and/or pre-detonators. For example, some detection systems include a stoichiometric diagnostic device. This type of device is capable of deciphering chemical signatures of unknown substances through metal or other barriers. An example of another detection device is a laser-induced breakdown spectroscopy system. This type of system is capable of detecting traces of explosives used for improvised explosive devices from distances, such as around 30 meters. Some improvised explosive devices, however, may not emit chemicals or have detectable amounts of explosives.

Therefore, it would be advantageous to have a method and apparatus that takes into account one or more of the issues discussed above, as well as possibly other issues.

SUMMARY

In one advantageous embodiment, an apparatus comprises a transmitter system, a receiver system, and a processor unit. The transmitter system is configured to transmit a first collimated beam having a first frequency and a second collimated beam having a second frequency. The receiver system is configured to detect a delayed difference frequency signal substantially equal to a difference between the first frequency and the second frequency. The delayed difference frequency signal is generated by an object having non-linear electrical characteristics in response to the object receiving the first collimated beam and the second collimated beam. The processor unit is connected to the transmitter system and the receiver system. The processor unit is configured to control the transmitter system and the receiver system to change at least one of the first frequency and the second frequency through a range of frequencies over time during transmission of the first collimated beam and the second collimated beam. The processor unit is configured to compare the delayed difference frequency signal with an undelayed difference frequency signal substantially equal to the difference between the first frequency and the second frequency to form a comparison. The processor unit is also configured to generate a range measurement for the object from the comparison.

In another advantageous embodiment, an apparatus comprises a transmitter system, a receiver system, and a processor unit. The transmitter system is configured to transmit a first plurality of electromagnetic signals having a first frequency and a second plurality of electromagnetic signals having a second frequency. The receiver system is configured to detect a delayed difference frequency signal substantially equal to a difference between the first frequency and the second frequency. The delayed difference frequency signal is generated by an object having non-linear electrical characteristics in response to the object receiving the first plurality of electromagnetic signals and the second plurality of electromagnetic signals. The processor unit is connected to the transmitter system and the receiver system. The processor unit is configured to control the transmitter system and the receiver system to change at least one of the first frequency and the second frequency through a range of frequencies over time during transmission of the first plurality of electromagnetic signals and the second plurality of electromagnetic signals. The processor unit is configured to compare the delayed difference frequency signal with an undelayed difference frequency signal substantially equal to the difference between the first frequency and the second frequency to form a comparison. The processor unit is also configured to generate a range measurement for the object from the comparison.

In yet another advantageous embodiment, a method is present for detecting objects. A first plurality of electromagnetic signals having a first frequency and a second plurality of electromagnetic signals having a second frequency are transmitted. At least one of the first frequency and the second frequency is changed through a range of frequencies. A delayed difference frequency signal substantially equal to a difference between the first frequency and the second frequency is monitored for. The delayed difference frequency signal is generated by an object having non-linear electrical characteristics in response to the object receiving the first plurality of electromagnetic signals and the second plurality of electromagnetic signals. A range measurement is generated for the object using the delayed difference frequency signal and an undelayed difference frequency signal. The undelayed difference frequency signal is substantially equal to the difference between the first frequency and the second frequency.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
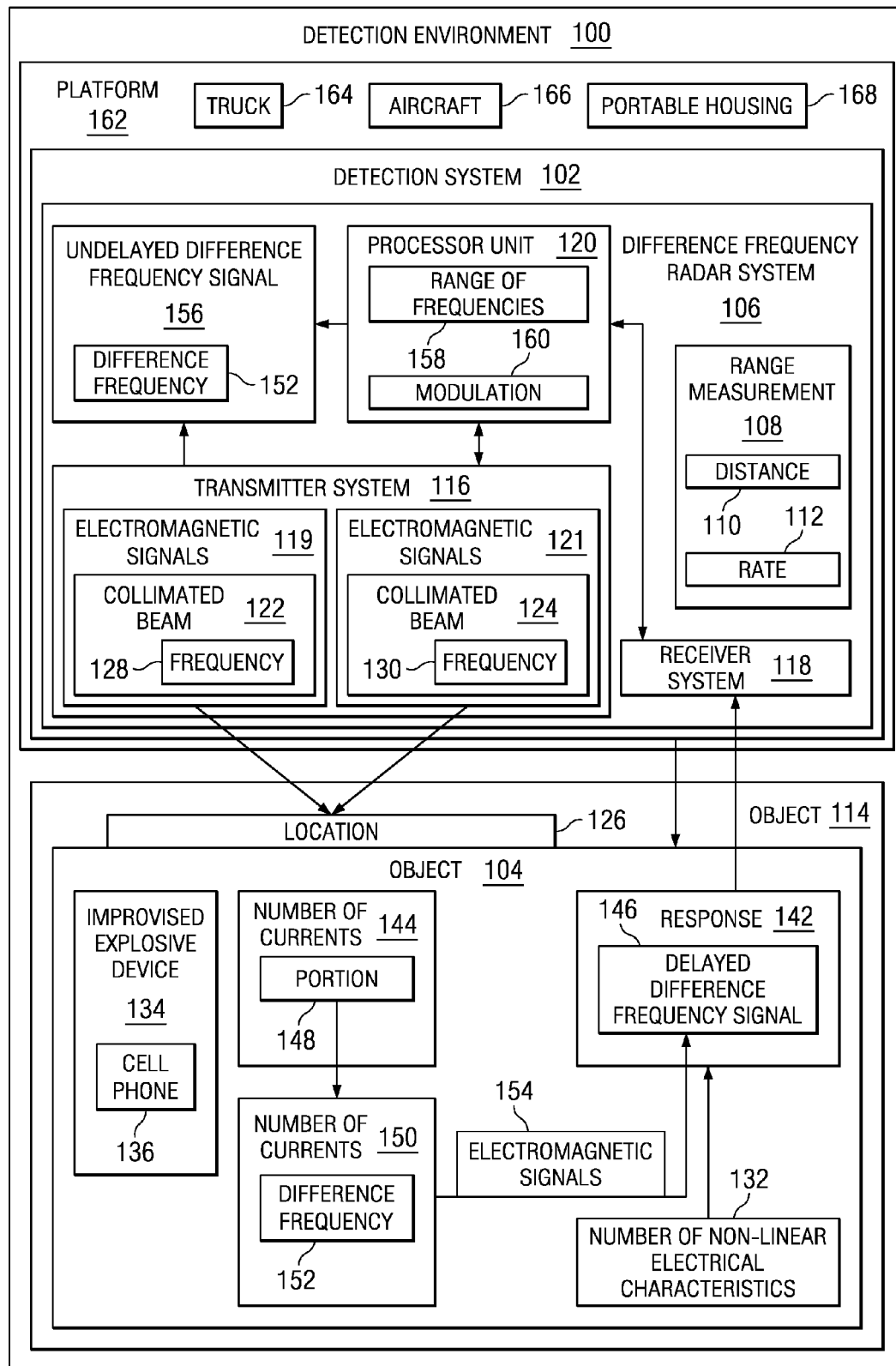
FIG. 1 is a diagram illustrating a detection environment in accordance with an advantageous embodiment.

The different advantageous embodiments recognize and take into account a number of different considerations as discussed below. For example, the different advantageous embodiments recognize and take into account that difference frequency radar systems may be used to detect targets. Difference frequency radar systems transmit two beams in which each beam has a different frequency. A non-linear target in the region in which the beams intersect may generate a response. This response is a difference frequency that may be detected. The different advantageous embodiments recognize and take into account that this type of detection system is capable of detecting targets that do not indicate the range or distance to the target.

The different advantageous embodiments recognize and take into account that it would be desirable to measure the distance to a target. This measurement may be used to make observations about the target. Further, with the distance to a target, actions to be taken can be identified.

As a more specific example, when difference frequency radar systems are used to locate improvised explosive devices, knowing the distance to the improvised explosive device may be useful in identifying an action. For example, the distance may be used to stop a vehicle at a safe distance from the improvised explosive device. In this manner, the vehicle can avoid traveling into the blast radius of the improvised explosive device.

The different advantageous embodiments also recognize and take into account that existing solutions may provide some indication of a distance to a target. For example, the strength of the response provides some indication of the distance of the target.

The different advantageous embodiments recognize and take into account that identifying a distance to a target by signal strength is inaccurate. This strength does not provide an actual measurement that can be used for some desired actions, such as stopping a vehicle outside of a blast radius of an improvised explosive device. For example, the signal strength may be affected by the magnitude of the target non-linear radar cross section. This cross section may vary widely making the use of the signal strength inaccurate.

Further, the different advantageous embodiments also recognize that the distance to the target may be identified through triangulation. With this system, two transmitters are physically separated and aimed to create a well-defined intersection at a predetermined range.

The different advantageous embodiments also recognize that this type of system, however, requires additional transmitters. Further, this type of system also requires identifying the distance and location between the transmitters. Also, triangulation may blind the system to targets at other ranges other than the one set between the two transmitters. Further, the different advantageous embodiments recognize that it is desirable to measure the distance to all targets that may be detected. As a result, triangulation may be less useful in situations with multiple targets as opposed to a single target.

The different advantageous embodiments further recognize that the distance to a target also may be identified by currently used radar technology. For example, the transmitter may be pulsed. Timing the delay of a return signal may be used to identify a distance to the target. Pulsing the transmission of signals is difficult to implement with the currently used devices.

The implementation of pulsing is difficult because of limits to the peak power. The peak power is limited by the breakdown voltage of semiconductors in the devices. Narrowly and widely spaced pulses with limited peak power provide a low average power. As a result, a poor signal to noise performance may result.

Thus, in recognition of these considerations, as well as possibly other considerations, the different advantageous embodiments provide a method and apparatus for identifying a location of a target. In particular, the different advantageous embodiments may identify a distance to a target. In one advantageous embodiment, an apparatus comprises a transmitter system, a receiver system, and a processor unit.

The transmitter system is configured to transmit a first plurality of electromagnetic signals having a first frequency and a second plurality of electromagnetic signals having a second frequency. The first plurality of electromagnetic signals and the second plurality of electromagnetic signals may be, for example, without limitation, a first collimated beam and a second collimated beam. The receiver system is configured to detect a delayed difference frequency signal equal to a difference between the first frequency and the second frequency. The delayed difference frequency signal is generated by an object having non-linear electrical characteristics in response to the object receiving the first collimated beam and the second collimated beam.

The processor unit is connected to the transmitter system and the receiver system. The processor unit is configured to control the transmitter system and the receiver system to change at least one of the first frequency and the second frequency through a range of frequencies over time during the transmission of the first collimated beam and the second collimated beam. Further, the processor unit is configured to compare the delayed difference frequency signal with an undelayed difference frequency signal to form a comparison. This comparison is used to generate a range measurement for the object.

With reference now to FIG. 1, a diagram illustrating a detection environment is depicted in accordance with an advantageous embodiment. In this example, detection environment 100 includes detection system 102.

Detection system 102 may be used to identify object 104. In the illustrative examples, detection system 102 may take the form of difference frequency radar system 106. Difference frequency radar system 106 employs non-linear radar technology to detect object 104. In these illustrative examples, detecting object 104 comprises at least one of detecting a presence of object 104 and identifying object 104.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Additionally, detection system 102 also is configured to generate range measurement 108 for object 104. The generation of range measurement 108 also may be part of the process used to detect object 104.

In these illustrative examples, range measurement 108 may include at least one of distance 110 and rate 112. In these examples, distance 110 is the measured distance between detection system 102 and object 104. Rate 112 is a rate of change of distance 110. This rate of change may be, for example, without limitation, velocity and/or acceleration. Distance 110 and rate 112 include errors caused by detection system 102. In other advantageous embodiments, the error may be corrected such that distance 110 and rate 112 are a range truth and a velocity truth, respectively.

In the illustrative examples, object 104 may be detected by detection system 102 even if object 104 is hidden or obscured by object 114. Object 104 may be hidden behind object 114, located within object 114, located under object 114, or in some other location in which object 114 hides object 104 from view. Object 114 may be, for example, without limitation, a box, fog, a blanket, the ground, and/or some other object that may be used to obscure and/or hide object 104 from view. Of course, in some illustrative examples, object 104 may not be obscured by object 114.

In these illustrative examples, detection system 102 includes transmitter system 116, receiver system 118, and processor unit 120. Transmitter system 116 is configured to transmit electromagnetic signal 119 in the form of collimated beam 122 and electromagnetic signal 121 in the form of collimated beam 124. A collimated beam is comprised of electromagnetic radiation in the form of rays that are substantially parallel. A collimated beam tends to spread more slowly as the electromagnetic radiation propagates as compared to electromagnetic radiation that has not been collimated. In these illustrative examples, collimated beam 122 and collimated beam 124 may have substantially the same intensities. Also, these beams may have substantially parallel-aligned polarizations at location 126.

In these illustrative examples, collimated beam 122 and collimated beam 124 are generated by transmitter system 116 in a manner such that collimated beam 122 and collimated beam 124 merge at location 126 for object 104.

Collimated beam 122 has frequency 128, while collimated beam 124 has frequency 130. Frequency 128 has a different value from frequency 130 in these illustrative examples. Frequency 128 and frequency 130 may be selected from a number of different frequencies. For example, without limitation, frequency 128 and frequency 130 may be frequencies selected from ranges, such as those for very high frequency (VHF) signals, ultra high frequency (UHF) signals, microwave signals, millimeter wave signals, and other suitable types of signals. These signals may vary in frequency from around 30 megahertz to around 300 gigahertz. Of course, other ranges also may be used, depending on the particular implementation.

In these examples, object 104 has number of non-linear electrical characteristics 132. As used herein, "a number of" when referring to items means one or more items. For example, number of non-linear electrical characteristics 132 means one or more non-linear electrical characteristics. In these illustrative examples, number of non-linear electrical characteristics 132 may include, for example, without limitation, conductive, capacitive, inductive, and/or other types of electrical characteristics.

For example, number of non-linear electrical characteristics 132 may be any number of characteristics in which current does not have a linear relationship with voltage. In the depicted examples, number of non-linear electrical characteristics may be two different types of metals in layers in object 104. Number of non-linear electrical characteristics 132 may be, for example, without limitation, a corroded or oxidized portion of a surface of object 104 that has different non-linear electrical characteristics from a non-corroded or non-oxidized portion of object 104.

As yet another example, object 104 may include a number of electronic circuits with non-linear components. These non-linear components may be, for example, without limitation, diodes, transistors, and/or other suitable components with non-linear electrical characteristics.

In these illustrative examples, object 104 may be, for example, without limitation, improvised explosive device 134 containing cell phone 136 as a trigger. Cell phone 136 contains components with number of non-linear electrical characteristics 132 in these illustrative examples. Cell phone 136 may contain components such as, for example, without limitation, diodes, transistors, and/or other suitable components that have number of non-linear electrical characteristics 132.

The particular components located within cell phone 136 and/or their arrangement may be used to identify cell phone 136 as a cell phone using detection system 102.

Further, the different advantageous embodiments are capable of identifying distance 110 through cell phone 136. When electromagnetic signals 119 for collimated beam 122 and electromagnetic signals 121 for collimated beam 124 encounter object 104 at location 126, response 142 is generated by number of non-linear electrical characteristics 132 in object 104. Response 142 takes the form of delayed difference frequency signal 146 in these illustrative examples.

Electromagnetic signals 119 and electromagnetic signals 121 cause number of currents 144 to be induced during the duration of electromagnetic signals 121 and electromagnetic signals 119 encountering object 104. In this illustrative example, when object 104 is improvised explosive device 134 with cell phone 136 as a trigger, number of currents 144 may be induced in cell phone 136.

Portion 148 of number of currents 144 is converted to and/or rectified into number of currents 150. Number of currents 150 has difference frequency 152. Difference frequency 152 is a difference between frequency 128 for electromagnetic signals 119 for collimated beam 122 and frequency 130 for electromagnetic signals 121 for collimated beam 124. Number of currents 150 radiate as electromagnetic signals 154, which form delayed difference frequency signal 146 in response 142. Response 142 is detected by receiver system 118 in these illustrative examples.

Delayed difference frequency signal 146 and response 142 may be a representation of object 104. This representation is used to characterize object 104 in the illustrative examples. For example, processor unit 120 uses delayed difference frequency signal 146 to identify distance 110 for object 104. In these illustrative examples, processor unit 120 compares delayed difference frequency signal 146 with undelayed difference frequency signal 156. Undelayed difference frequency signal 156 is generated by transmitter system 116 in these illustrative examples.

In these illustrative examples, undelayed difference frequency signal 156 is generated by transmitter system 116 using frequency 128 and frequency 130 to generate electromagnetic signals 119 and electromagnetic signals 121 in the form of collimated beam 122 and collimated beam 124. Thus, undelayed difference frequency signal 156 has difference frequency 152.

In yet other illustrative examples, undelayed difference frequency signal 156 may be generated by processor unit 120. Processor unit 120 may generate undelayed difference frequency signal 156 using frequency 128 and frequency 130. Of course, undelayed difference frequency signal 156 may be generated in other manners using other devices, depending on the particular implementation.

In these illustrative examples, processor unit 120 controls transmitter system 116 to change at least one of frequency 128 and frequency 130 through range of frequencies 158 over time during transmission of collimated beam 122 and collimated beam 124. In other words, either or both frequency 128 and frequency 130 may be changed through range of frequencies 158 over time during transmission of collimated beam 122 and collimated beam 124.

The changing of at least one of frequency 128 and frequency 130 results in modulation 160 for at least one of electromagnetic signals 119 for collimated beam 122 and electromagnetic signals 121 for collimated beam 124. This change through range of frequencies 158 may also be referred to as a "chirp".

In these examples, the change of frequency 128 and/or frequency 130 are performed such that frequency 128 and/or frequency 130 rise and/or fall linearly with time. Further, if both frequency 128 and frequency 130 are changed, the frequencies are changed away from each other. These linear changes may have different shapes such as, for example, without limitation, a triangular, a sinusoidal, or a ramp shape. Further, in some advantageous embodiments the change of frequency 128 and/or frequency 130 may be non-linear.

Modulation 160 of delayed difference frequency signal 146 and undelayed difference frequency signal 156 provide a capability to compare these two signals to identify a difference in time between different points in the signal. By identifying the difference or delay, range measurement 108 can be identified for object 104.

In these illustrative examples, detection system 102 may be associated with platform 162. In other words, detection system 102 may be located on, attached to, or otherwise associated with platform 162. Platform 162 may take different forms, depending on the particular implementation. For example, platform 162 may be truck 164, aircraft 166, portable housing 168, and/or another suitable type of platform.

The illustration of detection environment 100 is not meant to imply physical architectural limitations for the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, transmitter system 116 may transmit additional collimated beams in addition to collimated beams 122 and 124 to generate additional responses in addition to response 142. Further, these additional collimated beams may be directed at object 104 or other objects at the same time. As yet another example, in some advantageous embodiments, the processing of response 142 may be performed at a location remote to detection system 102.

In yet other advantageous embodiments, additional detection systems in addition to detection system 102 may be present in detection environment 100. These detection systems may be located on additional platforms in addition to platform 162 or on platform 162.

As yet another example, although the different illustrative examples depict the use of collimated beam 122 and collimated beam 124, electromagnetic signals 119 and electromagnetic signals 121 may be transmitted in other forms. For example, without limitation, the electromagnetic signal may be isotropically radiated to detect objects in all directions with no detriment to the ability to measure range.

Figure 2:
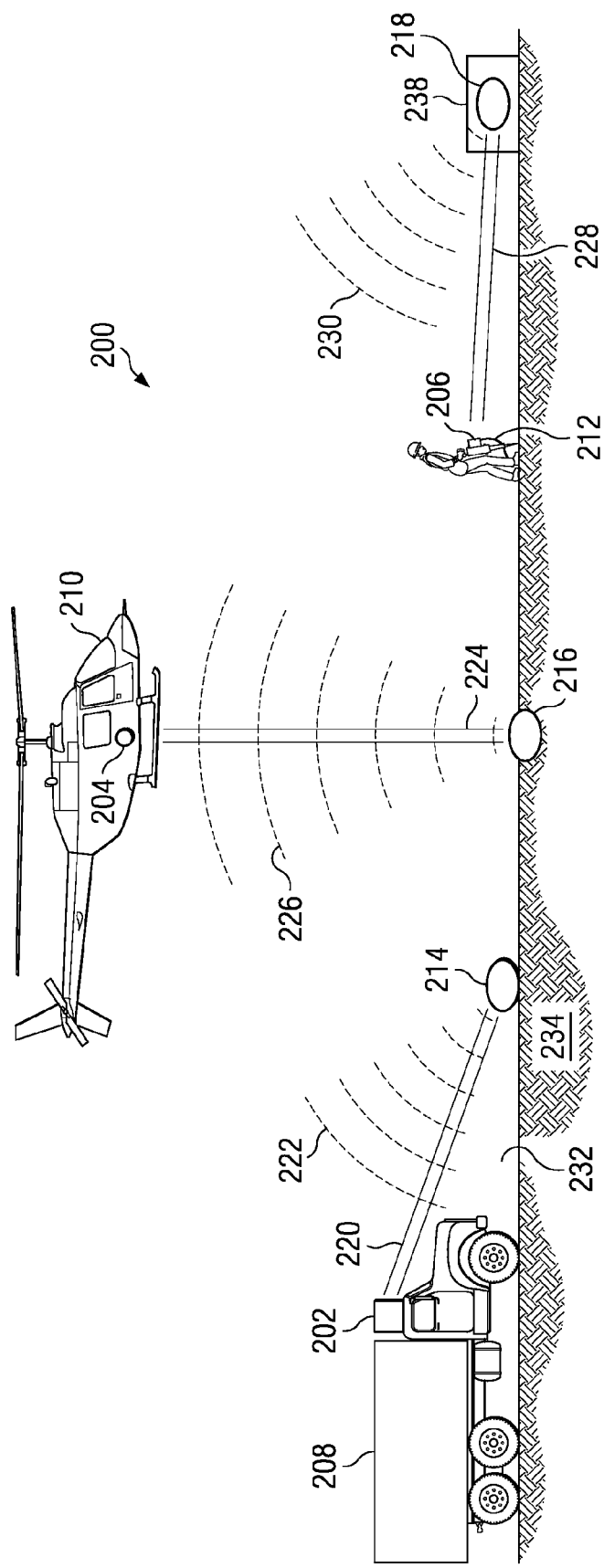
FIG. 2 is a diagram illustrating a detection environment in accordance with an advantageous embodiment.

With reference now to FIG. 2, a diagram illustrating a detection environment is depicted in accordance with an advantageous embodiment. In this illustrative example, detection environment 200 is an example of an implementation of detection environment 100 in FIG. 1.

In this illustrative example, three detection systems are shown in detection environment 200. These detection systems include, for example, detection systems 202, 204, and 206. These detection systems are mounted on different types of platforms. For example, detection system 202 is mounted on truck 208, detection system 204 is mounted on helicopter 210, and detection system 206 is located within portable instrument 212. These detection systems may be used to detect objects such as, for example, objects 214, 216, and 218. Further, detection systems 202, 204, and 206 may be used to make range measurements as part of detecting these and other objects that may be present within detection environment 200.

Detection system 202 generates electromagnetic signals 220 in the form of two collimated beams in this depicted example. These collimated beams encounter object 214. In response to object 214 having non-linear electrical characteristics, response 222 is generated and detected by detection system 202.

In a similar fashion, detection system 204 in helicopter 210 generates electromagnetic signals 224. Electromagnetic signals 224 also may take the form of two collimated beams that overlap at object 216. In these illustrative examples, electromagnetic signals 224 may be millimeter wave range signals. Object 216 has non-linear electrical characteristics. Response 226 is generated and detected by detection system 204.

Detection system 206 in portable housing 212 generates electromagnetic signals 228. These signals also may take the form of collimated beams. Object 218 generates response 230 if object 218 has non-linear electrical characteristics. Response 230 is detected by detection system 206 in these examples.

In this illustrative example, object 214 is on surface 232 of ground 234. Object 216 may be located under surface 232 of ground 234. Object 218 may be fitted within box 238 or some other object, depending on the particular implementation. Of course, the particular platform used may vary, depending on where the objects may be located. Different platforms may be used, depending on the potential locations for different objects. For example, without limitation, detection system 202 mounted on truck 208 may be used to detect objects under ground 234. As yet another example, helicopter 210 with detection system 204 may be used to detect objects on surface 232 of ground 234.

The different detection systems in these depicted examples generate range measurements. A range measurement may include, for example, at least one of a distance to the object and a rate of change to the distance of the object. This rate of change to the distance of the object may be caused by movement of the platform in which the detection systems is located. Also, in some advantageous embodiments, the object may be moving or may be associated with another moving object.

Figure 3:
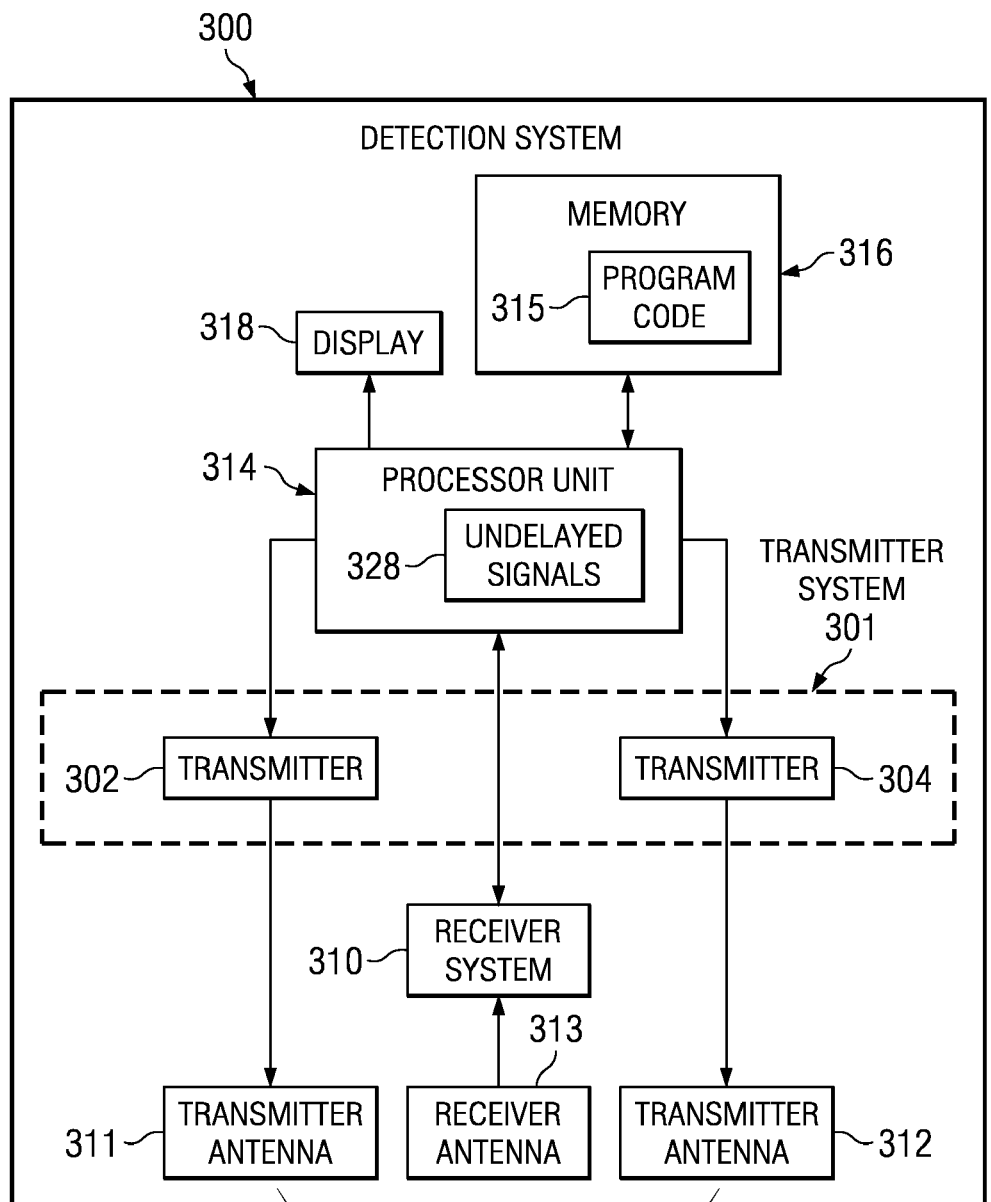
FIG. 3 is a block diagram of a detection system in accordance with an advantageous embodiment.

With reference now to FIG. 3, a block diagram of a detection system is depicted in accordance with an advantageous embodiment. Detection system 300 is an example of one implementation for detection system 102 in FIG. 1. In this illustrative example, detection system 300 is an example of an apparatus that may be associated with various platforms for use in detecting objects.

In this illustrative example, detection system 300 includes transmitter system 301 with transmitter 302 and transmitter 304 and receiver system 310. Detection system 300 also includes transmitter antenna 311, transmitter antenna 312, and receiver antenna 313. Processor unit 314, memory 316, and display 318 also are located in detection system 300.

Processor unit 314 executes program code 315 stored in memory 316 to control the operation of detection system 300 in these illustrative examples. Of course, in other advantageous embodiments, processor unit 314 may be an application specific integrated circuit (ASIC) that does not need program code to operate detection system 300.

Transmitter antennas 311 and 312 receive electromagnetic energy from transmitters 302 and 304, respectively, and radiate the electromagnetic energy as electromagnetic signals in collimated beams 320 and 322 in these illustrative examples. Depending on the implementation, a single antenna may be used in place of transmitter antennas 311 and 312.

Transmitters 302 and 304 may be designed to share a single antenna in this type of implementation. Response signals 324 collected by receiver antenna 313 are routed to receiver system 310. Receiver system 310 filters and/or amplifies response signals 324 for further processing. This processing may include interpretation, storage, and display data for response signals 324.

In these examples, transmitter 302 and transmitter 304 are capable of generating electromagnetic signals emitted as collimated beam 320 and collimated beam 322 having characteristics. These characteristics may include, for example, without limitation, frequency, amplitude, polarization, and/or other suitable attributes.

For example, transmitter 302 may generate electromagnetic signals for collimated beam 320 that are emitted by transmitter antenna 311 with the first frequency f1. Transmitter 304 may generate electromagnetic signals for collimated beam 322 that are emitted by transmitter antenna 312 with the second frequency f2.

The frequencies and amplitudes at which transmitters 302 and 304 generate collimated beams 320 and 322 are controlled by processor unit 314 in these examples. Processor unit 314 acts as a controller to generate collimated beams 320 and 322 in these examples. Information about response signals 324 may be used to help determine the resonant nature (the Q) of objects with non-linear electrical characteristics to help identify object 326, as well as to make range measurements for an object.

Processor unit 314 may perform these and other operations based on program code 315 stored in memory 316. Characteristics of response signals 324 received by receiver system 310 may be displayed on display 318. Further, display 318 also may provide other information, such as that which may be used to identify object 326, the range or location of object 326, the orientation of object 326, the depth of object 326 in the ground, and/or other suitable information.

Receiver system 310 is designed to detect signals at the difference frequency of the dual beams of the transmitter system. Additionally, processor unit 314 also sets receiver system 310 to detect a range of difference frequency signals through which response signals 324 from object 326 are expected.

The difference between the first frequency f1 and the second frequency f2 is equal to a difference frequency that is set for receiver system 310 in these examples. Additionally, receiver system 310 also may be set to receive harmonics of the difference frequencies to improve sensitivity and/or to help identify the object. The frequency selected for transmitters 302 and 304 are such that they do not affect the electronics in receiver system 310. Receiver system 310 is not configured or programmed to detect signals at the frequencies set for transmitters 302 and 304. Receiver system 310 is designed to be sensitive to the difference frequency in these illustrative examples.

As an example, transmitter 302 may be set to transmit at around 90.5 gigahertz, while transmitter 304 may be set to transmit at around 91.5 gigahertz. The difference between these two frequencies is around 1.0 gigahertz. At least one of transmitter 302 and transmitter 304 may change in frequency over time.

As an example, transmitter 302 may be set to sweep the frequency from around 90.5 gigahertz through a range of frequencies downward by around 50 megahertz to around 90.45 gigahertz. The sweep of the frequency is linear in this example. The sweep of the frequency may have a triangle shape. Transmitter 304 may be operated to simultaneously sweep the frequency through a range of frequencies from around 91.5 gigahertz to around 91.55 gigahertz. Receiver system 310 is set to detect signals at around 1 gigahertz to around 1.1 gigahertz.

When electromagnetic signals in collimated beams 320 and 322 reach object 326, currents at the millimeter wave frequencies are induced within conductive and semi-conductive parts of object 326. Some of these induced currents will be rectified and converted to currents with difference frequency $\Delta f$ in portions of the conductive parts of object 326 with non-linear electrical characteristics. These currents with frequency $\Delta f$ will result in the generation of an electromagnetic signal, such as a reradiated electromagnetic field in the form of response signals 324. Response signals 324 are captured by receiver antenna 313 in these examples.

Receiver system 310 detects response signals 324 and sends this data to processor unit 314 for processing and analysis. In these examples, receiver system 310 does not detect electromagnetic signals reflected from the object and other surfaces at the frequencies of collimated beams 320 and 322, because receiver system 310 is set to detect a frequency that is the difference between the frequency transmitted by transmitter 302, the frequency transmitted by transmitter 304, and the harmonic frequencies for this difference frequency.

The non-linear electrical characteristics are found in objects, such as improvised explosive devices. Electrical non-linearities may be present in these objects because of circuits that are present that have electrical non-linearities. These circuits usually include diodes, transistors, and/or other components that have electrical non-linearities. The non-linear electrical characteristics within the object causes a response signal that has a frequency equal to the difference between the two transmitted signals to be returned. This response is detected by receiver system 310 in this example.

In these examples, the penetration of electromagnetic fields of collimated beams 320 and 322 in materials increases as the frequencies used decrease. Angular resolution, however, decreases as well, as the frequencies decrease. More specifically, the spatial resolution decreases. In this illustrative example, transmitter 302 and transmitter 304 may continuously transmit at frequencies f1 and f2. With this type of operation, receiver system 310 detects the frequency that is the difference between these two frequencies along with the harmonics of that frequency.

As a result, response signals 324, when detected by receiver system 310, are processed by processor unit 314 indicating the presence of and/or to identify object 326. Response signals 324 also may be used to identify object 326. Further, with the movement of detection system 300 in a direction relative to object 326, the shape, orientation, and distance to object 326, as well as the rate at which the distance to object 326 changes may be identified through continued detection of response signals 324.

The distance to object 326 and the rate at which the distance to object 326 changes may be identified using response signals 324 and undelayed signals 328. The rate at which the distance to object 326 changes may be caused by the movement of at least one of object 326 and detection system 300.

Undelayed signals 328, in the depicted examples, are signals based on the transmission of collimated beam 320 and collimated beam 322. In other words, undelayed signals 328 have the same frequency and frequency changes as these collimated beams are transmitted by transmitter 302 and transmitter 304. Response signals 324 are a delayed version of undelayed signals 328. As a result, undelayed signals 328 may be compared to response signals 324 to identify delays between response signals 324 and undelayed signals 328. This delay may be used to identify a distance and/or rate of change of a distance for object 326.

Figure 4:
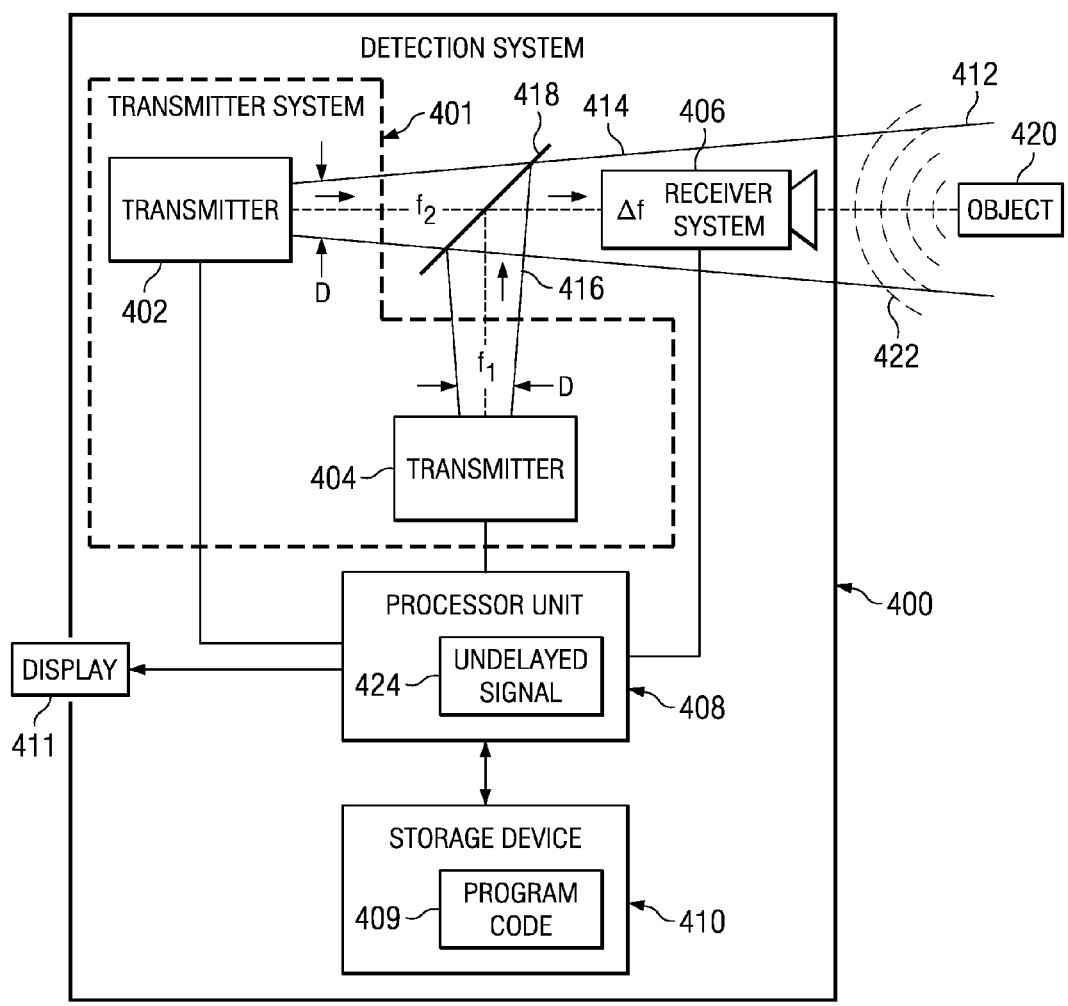
FIG. 4 is a diagram illustrating a detection system in accordance with an advantageous embodiment.

With reference next to FIG. 4, a diagram illustrating a detection system is depicted in accordance with an advantageous embodiment. In this illustrative example, detection system 400 is an example of another implementation of detection system 102 in FIG. 1. In this particular example, detection system 400 includes transmitter system 401 with transmitter 402, transmitter 404, and receiver system 406. Detection system 400 also includes processor unit 408, storage device 410, and display 411.

Processor unit 408 operates to control transmitter 402 and transmitter 404. Further, processor unit 408 receives data for signals detected by receiver system 406. Processor unit 408 executes program code 409 that may be located in storage device 410. Results of response signals detected by receiver system 406 may be presented on display 411.

In this illustrative example, detection system 400 generates electromagnetic signals in the form of a single beam, beam 412. Beam 412 is generated through a combination of collimated beams 414 and 416, which are generated by transmitter 402 and transmitter 404, respectively. Collimated beams 414 and 416 also may be linearly polarized.

Transmitter 404 generates collimated beam 416 with a first frequency f1. Transmitter 402 generates collimated beam 414 with a second frequency f2. These two beams are combined into beam 412 using beam combiner 418.

In this depicted example, beam 412 is a combined circularly polarized beam with an interference difference frequency. This interference difference frequency is the difference between frequency f1 generated by transmitter 404 and frequency f2 generated by transmitter 402. Beam 412 may be directed towards object 420, which may be on the surface of the ground, buried in the ground, and/or obscured by another object in these examples. Object 420 has electrical non-linear characteristics that cause currents at the difference frequency to be induced in object 420.

Electromagnetic signals may be emitted from these currents in the form of response signal 422. Object 420 generates response signal 422 with a frequency that is the difference between frequency f1 generated by transmitter 404 and frequency f2 generated by transmitter 402. This frequency is also referred to as a difference frequency or the fundamental frequency.

In these illustrative examples, transmitter 402 and transmitter 404 may be controlled by processor unit 408 to transmit collimated beam 414 and collimated beam 416 through a range of frequencies based off of frequency f1 and frequency f2. At least one of transmitter 402 and transmitter 404 may change in frequency over time. The sweep of the frequency is linear, in this example, but also may be non-linear. The sweep of the frequency may have a triangular shape.

Response signal 422 is detected by receiver system 406, which sends the information in response signal 422 to processor unit 408 for processing. Response signal 422 has a frequency that is a difference between frequency f1 and frequency f2. Further, this difference frequency also changes through a range of frequencies based on the sweeping of at least one of frequency f1 and frequency f2.

Response signal 422 may be compared with undelayed signal 424. Undelayed signal 424 has the same frequency changes as found in response signal 422. Response signal 422 is a weaker version of undelayed signal 424 in these examples. Response signal 422 may be delayed in time because of the distance response signal 422 travels from object 420 back to receiver system 406. This difference may be used to identify the distance to object 420 as well as the rate of change in the distance to object 420.

In this illustrative example, undelayed signal 424 is generated by transmitter 404. In other advantageous embodiments, processor unit 408 may generate undelayed signal 424 based on identifying the frequencies being used to transmit collimated beam 414 and collimated beam 416.

Figure 5:
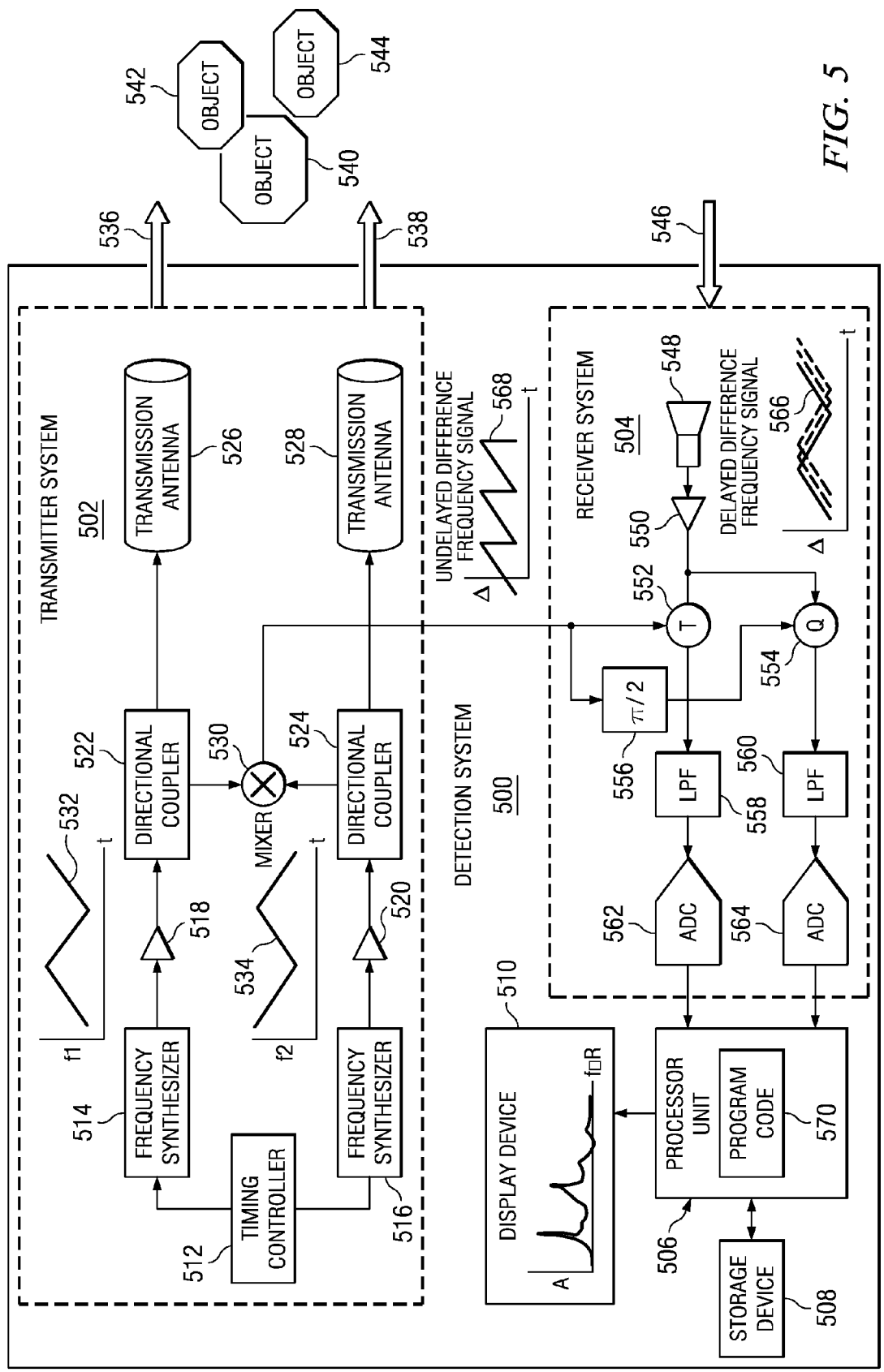
FIG. 5 is a diagram of a detection system in accordance with an advantageous embodiment.

Turning now to FIG. 5, a diagram of a detection system is depicted in accordance with an advantageous embodiment. In this illustrative example, detection system 500 is an example of yet another implementation of detection system 102 in FIG. 1. Detection system 500 may be associated with a platform for use.

In this example, detection system 500 includes transmitter system 502, receiver system 504, processor unit 506, storage device 508, and display device 510.

Transmitter system 502 includes timing controller 512, frequency synthesizer 514, frequency synthesizer 516, amplifier 518, amplifier 520, directional coupler 522, directional coupler 524, transmission antenna 526, transmission antenna 528, and mixer 530. Timing controller 512 is connected to frequency synthesizer 514 and frequency synthesizer 516. Timing controller 512 controls the generation of signals, such as signals 532 and 534.

Signal 532 has a frequency f1, while signal 534 has a frequency f2 in these examples. As can be seen, signals 532 and 534 have triangular frequency profiles. The frequencies in these signals change such that one frequency changes direction away from another frequency.

In this example, both signal 532 and signal 534 change in frequency. In other advantageous embodiments, only one of the signals may change.

Signal 532 and signal 534 travels through amplifier 518 and amplifier 520, respectively, to directional coupler 522 and directional coupler 524. In this example, directional coupler 522 and directional coupler 524 sends a small fraction of power from signal 532 and signal 534 to mixer 530. Mixer 530 produces undelayed difference frequency signal 568.

Directional coupler 522 couples the remaining fraction of signal 532 to collimated beam 536 using transmission antenna 526. Directional coupler 524 couples the remaining fraction of signal 534 to collimated beam 538 through transmission antenna 528. Collimated beam 536 and collimated beam 538 may encounter multiple objects such as, for example, object 540, object 542, and object 544.

In response to collimated beam 536 and collimated beam 538 encountering objects 540, 542, and 544, response 546 is generated. Response 546 is detected by receiver system 504. In this illustrative example, receiver system 504 includes antenna 548, amplifier 550, mixer 552, mixer 554, phase shifter 556, low pass filter 558, low pass filter 560, analog-to-digital converter 562, and analog-to-digital converter 564.

Response 546 is received by antenna 548. Response 546, in these examples, includes delayed difference frequency signal 566. This signal is amplified using amplifier 550. The input of amplifier 550 is connected to the output of antenna 548. The output of amplifier 550 is connected to mixer 552 and mixer 554. Mixer 552 is connected to the output of mixer 530. Mixer 554 is connected to mixer 530 through phase shifter 556. Phase shifter 556 shifts the phase of the undelayed difference frequency signal by approximately $\pi/2$ radians or 90 degrees.

In these examples, mixer 530 generates undelayed difference frequency signal 568. Delayed difference frequency signal 566 is identical to undelayed difference frequency signal 568, except delayed difference frequency signal 566 may be delayed in time. This delay is the time needed for delayed difference frequency signal 566 to travel from objects 540, 542, and 544 back to detection system 500.

Mixer 552 combines delayed difference frequency signal 566 and undelayed difference frequency signal 568 to produce a signal having a frequency that is the difference between delayed difference frequency signal 566 and undelayed difference frequency signal 568. Mixer 554 combines delayed difference frequency signal 566 and $\pi/2$ phase shifted undelayed difference frequency signal 568. The output of mixer 554, in conjunction with the output of mixer 552, indicates which signal has the greater frequency.

The output of mixer 552 is connected to the input of low pass filter 558. The output of mixer 554 is connected to low pass filter 560. These low pass filters are used to limit the bandwidth of the signals from mixers 552 and 554 to less than half the sample rate of analog-to-digital converters 562 and 564. The filters also remove noise from the signals.

Analog-to-digital converter 562 is connected to the output of low pass filter 558. Analog-to-digital converter 564 is connected to the output of low pass filter 560. These converters generate a digital signal that is sent to processor unit 506 for processing. Processor unit 506 executes program code 570 to analyze these signals in detecting objects 540, 542, and 544. Further, program code 570 also is used to control timing controller 512 to control the generation of collimated beams 536 and 538. Part of detecting these objects may include making range measurements. These range measurements may include identifying a distance to the objects, as well as a rate of change of the distance to the objects.

The configuration of detection system 500 in FIG. 5 utilizes an "Inphase/Quadrature" detector to allow operation where the frequency shift from range rate may be equal in magnitude but opposite in sign to the frequency difference between delayed and undelayed signals. In situations where the frequency shift from the range rate is small, mixer 554, phase shifter 556, low pass filter 560, and analog-to-digital converter 564 may be omitted.

These results may be presented on display device 510. As a result, a user may take various actions, depending on the results displayed on display device 510. For example, an operator may determine how close a platform may move to objects 540, 542, and 544 to stay out of a blast radius that may be present if these objects are identified as improvised explosive devices. Further, an operator may determine what actions to take if one or more of objects 540, 542, and 544 are moving towards or away from detection system 500.

In the examples, the mixer output signal is processed digitally via a fast Fourier transform (FFT) to determine its frequency content. Each bin of the spectrum produced by the fast Fourier transform corresponds to a specific time delay, and hence a specific range. If multiple targets are present within an instantaneous field of view, multiple delayed versions of the difference signal will be received.

This situation will cause the mixer output to have multiple frequencies and will cause energy peaks to appear in multiple bins of the fast Fourier transform output spectrum. A strong target at one range plus a weak target at another range will cause the fast Fourier transform output spectrum to have a large peak in a bin corresponding to the first range plus a small peak in a bin corresponding to the second range. If the targets are within the same range bin, the targets will appear as a single peak.

The illustration of the different detection systems in FIGS. 3-5 have been presented for purposes of illustrating some examples of the manner in which detection system 102 in FIG. 1 may be implemented. Of course, detection systems in other advantageous embodiments may be implemented in other ways. For example, the undelayed difference frequency signal may be generated directly by the processor unit controlling the transmission of the collimated beams. With this type of implementation, mixer 530 is not needed. Instead, processor unit 506 may receive the delayed difference frequency signal in the response and make the comparison based on an undelayed difference frequency signal generated by the processor unit.

In yet other advantageous embodiments, a display device may be unnecessary. Still, in yet other advantageous embodiments, the transmission of collimated beams and the processing of data may be performed by a processor unit that is located remotely to detection system 102 in FIG. 1.

Figure 6:
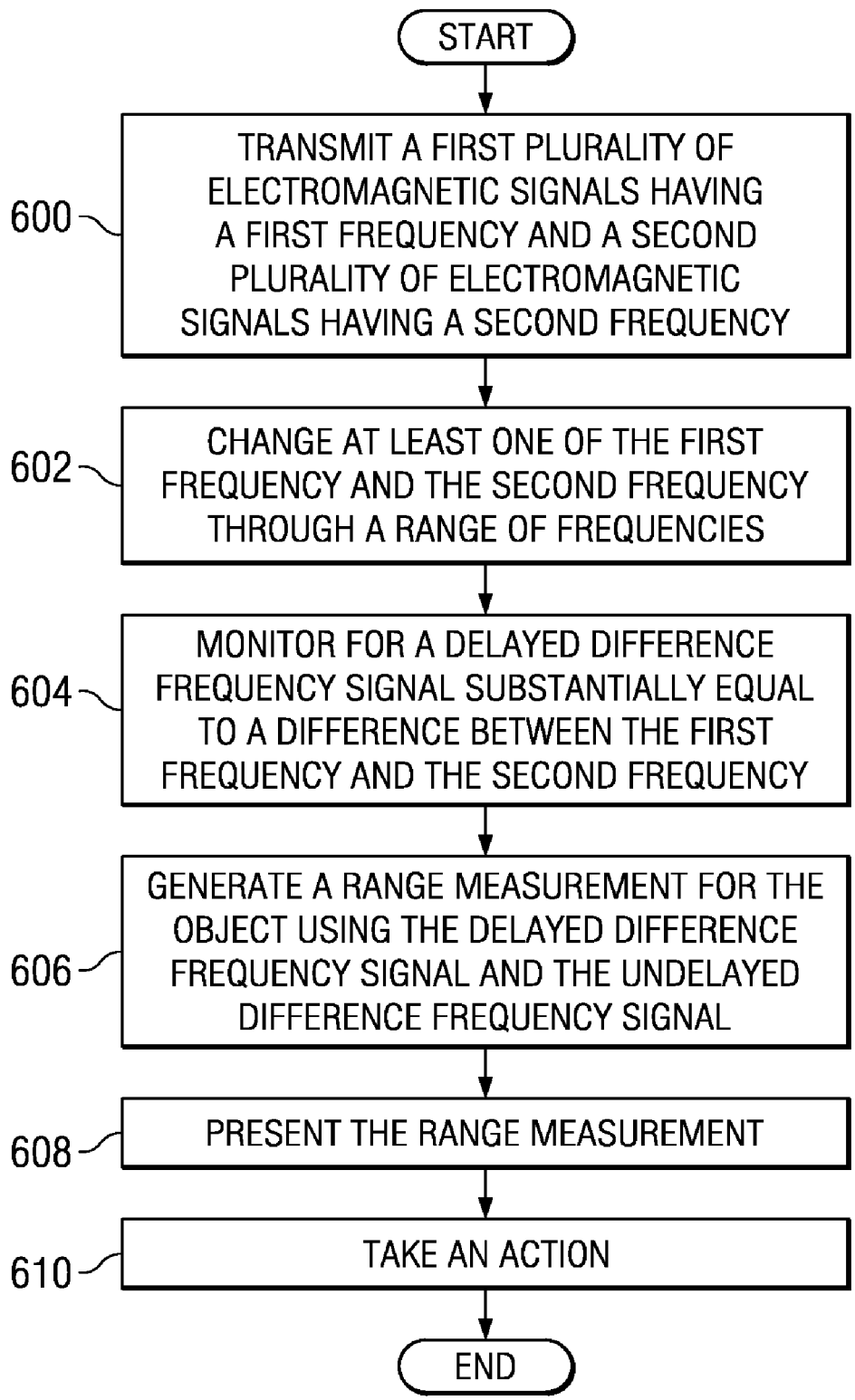
FIG. 6 is a flowchart of a process for detecting an object in accordance with an advantageous embodiment.

With reference now to FIG. 6, a flowchart of a process for detecting an object is depicted in accordance with an advantageous embodiment. The process illustrated in FIG. 6 may be implemented in detection environment 100. In particular, one or more of the operations in FIG. 6 may be implemented using a detection system, such as detection system 102 in FIG. 1.

The process begins by transmitting a first plurality of electromagnetic signals having a first frequency and a second plurality of electromagnetic signals having a second frequency (operation 600). In these illustrative examples, the electromagnetic signals are collimated beams. For example, the first plurality of electromagnetic signals may take the form of a first collimated beam, while the second plurality of electromagnetic signals may take the form of a second collimated beam.

The process changes at least one of the first frequency and the second frequency through a range of frequencies (operation 602). In these examples, the change of frequency may be linear or non-linear, depending on the particular implementation. If both frequencies are changed, the frequencies may be changed such that the frequencies increase the difference between the first frequency and the second frequency.

The process then monitors for a delayed difference frequency signal substantially equal to a difference between the first frequency and the second frequency (operation 604). The delayed difference frequency signal is generated by an object having non-linear electrical characteristics in response to the object receiving the first plurality of electromagnetic signals and the second plurality of electromagnetic signals.

The process then generates a range measurement for the object using the delayed difference frequency signal and the undelayed difference frequency signal (operation 606). The undelayed difference frequency signal is substantially equal to the difference between the first frequency and the second frequency. In these examples, the range measurement may be at least one of a distance to the object and a rate at which the distance changes to the object. The distance may change for an object based on a movement of at least one of the object and the platform on which the detection system is associated. The range measurement is then presented (operation 608). The presentation of the range measurement may be made on a display device.

Thereafter, an action is taken (operation 610), with the process terminating thereafter. The action may be, for example, without limitation, identifying how close personnel or vehicles may move to the object or identifying a location of the object to remove or further examine the object. Of course, other actions may be taken, depending on the type of object being identified. For example, if the object is an improvised explosive device, the object may be detonated with other vehicles and personnel at a safe distance, based on the identified range measurement.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some advantageous embodiments, one or more blocks may be unnecessary. For example, without limitation, in FIG. 6, operation 610 in which an action is taken may be unnecessary. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for detecting objects. In the different advantageous embodiments, an apparatus may include a transmitter system, a receiver system, and a processor unit.

The transmitter system is configured to transmit a first plurality of electromagnetic signals having a first frequency and a second plurality of electromagnetic signals having a second frequency. The receiver system is configured to detect a delayed difference frequency signal substantially equal to a difference between a first frequency and a second frequency. The delayed difference frequency signal is generated by an object having non-linear electrical characteristics in response to the object receiving the first plurality of electromagnetic signals and a second plurality of electromagnetic signals.

The processor unit is connected to the transmitter system and the receiver system. The processor unit is configured to control the transmitter system and the receiver system to change at least one of the first frequency and the second frequency through a range of frequencies over time during the transmission of the first plurality of electromagnetic signals and the second plurality of electromagnetic signals. Further, the processor unit compares the delayed difference frequency signal with an undelayed difference frequency signal that is substantially equal to the difference between the first frequency and the second frequency to form a comparison. The processor unit also generates a range measurement for the object from the comparison.

The comparison of the signals may be performed by mixing the signals. This mixing of the signals produces a signal with a frequency equal to the difference of the frequencies for the two signals. In these examples, the output of a mixer, such as mixer 552, indicates the magnitude of the frequency difference. The mixer may not provide an indication of which signal had the greater frequency. By using a second mixer, such as mixer 554, an identification of the sign of the frequency difference can be identified. In this manner, the different advantageous embodiments provide a capability for identifying a range or distance to an object.

The description of the different advantageous embodiments has been presented for purposes of illustration and description, and it is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a transmitter system configured to transmit a first collimated beam having a first frequency and a second collimated beam having a second frequency;
a receiver system configured to detect a delayed difference frequency signal substantially equal to a difference between the first frequency and the second frequency, wherein the delayed difference frequency signal is generated by an object having non-linear electrical characteristics in response to the object receiving the first collimated beam and the second collimated beam; and
a processor unit connected to the transmitter system and the receiver system, wherein the processor unit is configured to control the transmitter system and the receiver system to change at least one of the first frequency and the second frequency through a range of frequencies over time during transmission of the first collimated beam and the second collimated beam; compare the delayed difference frequency signal with an undelayed difference frequency signal substantially equal to the difference between the first frequency and the second frequency to form a comparison, and generate a range measurement for the object from the comparison.

2. The apparatus of claim 1, wherein the range measurement is selected from at least one of a distance to the object and a rate at which the distance changes for the object.

3. The apparatus of claim 1, wherein the processor unit changes the first frequency and the second frequency such that the difference between the first frequency and the second frequency increases.

4. The apparatus of claim 1, wherein the processor unit is configured to change at least one of the first frequency and the second frequency through the range of frequencies over time during the transmission of the first collimated beam and the second collimated beam as a linear function of time.

5. The apparatus of claim 4, wherein a frequency of at least one of the first frequency and the second frequency through changes through the range of frequencies over time during the transmission of the first collimated beam and the second collimated beam as the linear function of time in a triangular shape.

6. The apparatus of claim 1, wherein the first collimated beam and the second collimated beam are combined into a single beam.

7. The apparatus of claim 1, wherein the undelayed difference frequency signal is generated by the transmitter system.

8. The apparatus of claim 7, wherein the transmitter system generates the difference between the first frequency and the second frequency to form the undelayed difference frequency signal.

9. The apparatus of claim 1 further comprising:
a mixer, wherein the mixer generates the undelayed difference frequency signal using the first frequency and the second frequency.

10. The apparatus of claim 1, wherein the object is at a location and is selected from one of under a ground, on the ground, in a structure, and on a person.

11. The apparatus of claim 1 further comprising:
a platform, wherein the transmitter system, the receiver system, and the processor unit are associated with the platform.

12. The apparatus of claim 11, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a portable housing, and a building.

13. An apparatus comprising:
a transmitter system configured to transmit a first plurality of electromagnetic signals having a first frequency and a second plurality of electromagnetic signals having a second frequency;
a receiver system configured to detect a delayed difference frequency signal substantially equal to a difference between the first frequency and the second frequency, wherein the delayed difference frequency signal is generated by an object having non-linear electrical characteristics in response to the object receiving the first plurality of electromagnetic signals and the second plurality of electromagnetic signals; and
a processor unit connected to the transmitter system and the receiver system, wherein the processor unit is configured to control the transmitter system and the receiver system to change at least one of the first frequency and the second frequency through a range of frequencies over time during transmission of the first plurality of electromagnetic signals and the second plurality of electromagnetic signals; compare the delayed difference frequency signal with an undelayed difference frequency signal substantially equal to the difference between the first frequency and the second frequency to form a comparison, and generate a range measurement for the object from the comparison.

14. A method for detecting objects, the method comprising:
transmitting a first plurality of electromagnetic signals having a first frequency and a second plurality of electromagnetic signals having a second frequency;
changing at least one of the first frequency and the second frequency through a range of frequencies;
monitoring for a delayed difference frequency signal substantially equal to a difference between the first frequency and the second frequency, wherein the delayed difference frequency signal is generated by an object having non-linear electrical characteristics in response to the object receiving the first plurality of electromagnetic signals and the second plurality of electromagnetic signals; and
generating a range measurement for the object using the delayed difference frequency signal and an undelayed difference frequency signal, wherein the undelayed difference frequency signal is substantially equal to the difference between the first frequency and the second frequency.

15. The method of claim 14, wherein the range measurement is selected from at least one of a distance to the object and a rate at which the distance changes for the object.

16. The method of claim 14, wherein the changing step comprises:
changing the first frequency and the second frequency such that the difference between the first frequency and the second frequency increases or decreases.

17. The method of claim 14, wherein the generating step comprises:
comparing the delayed difference frequency signal with the undelayed difference frequency signal to identify an amount of delay between the delayed difference frequency signal and the undelayed difference frequency signal; and
identifying a distance to the object from the amount of delay to form the range measurement.

18. The method of claim 14, wherein the generating step comprises:
comparing the delayed difference frequency signal with the undelayed difference frequency signal to identify an amount of delay between the delayed difference frequency signal and the undelayed difference frequency signal; and
identifying a rate at which a distance changes for the object from the amount of delay to form the range measurement.

19. The method of claim 14 further comprising:
identifying a rate at which a distance to the object changes using the delayed difference frequency signal and the undelayed difference frequency signal.

20. The method of claim 14, wherein the first plurality of electromagnetic signals is a first collimated beam and the second plurality of electromagnetic signals is a second collimated beam.

* * * * *